Inventors
FRANK C. AULIFFE & JOHN DURTNAL
By

Inventors
FRANK C. AULIFFE & JOHN DURTNAL
By

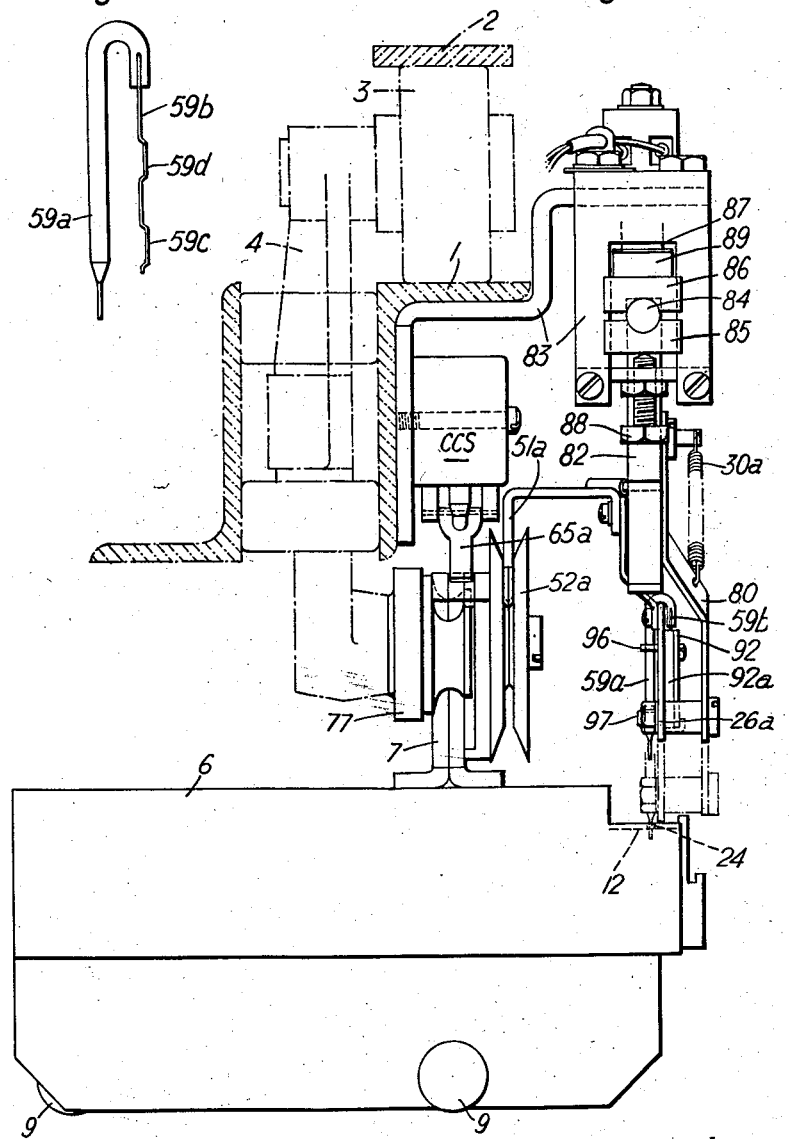

March 10, 1959   F. C. AULIFFE ET AL   2,876,888
RECORD CARD CONTROLLED MECHANISM
Filed Feb. 12, 1957   6 Sheets-Sheet 6
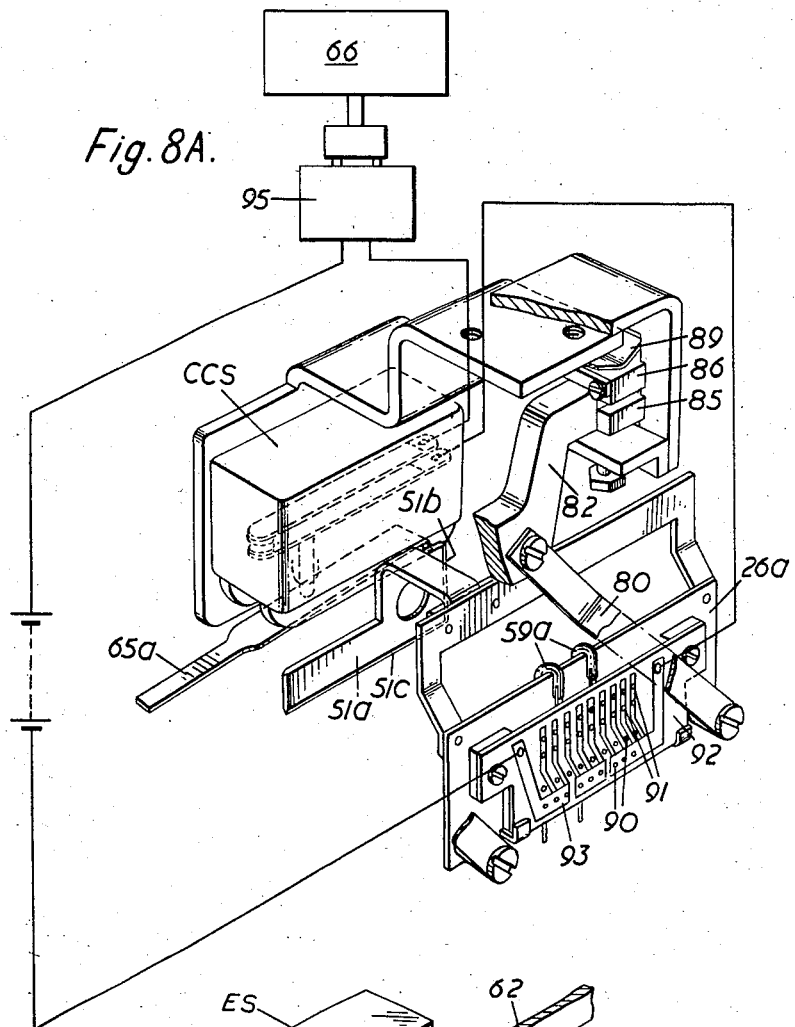
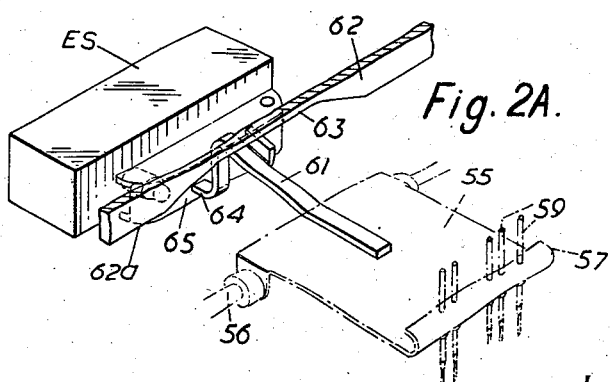
Inventor
FRANK C. AULIFFE &
JOHN DURTNAL
By

United States Patent Office 2,876,888
Patented Mar. 10, 1959

2,876,888

RECORD CARD CONTROLLED MECHANISM

Frank Compson Auliffe, Beckenham, and John Durtnal, South Norwood, England, assignors to Powers-Samas Accounting Machines Limited, London, England, a British company Application February 12, 1957, Serial No. 639,812

Claims priority, application Great Britain March 20, 1956

17 Claims. (Cl. 198—38)

This invention relates to record card controlled mechanisms and in particular to the control of conveyor systems whereby, under control of statistical record cards, article carriers suspended from a travelling conveyor may be unloaded automatically at pre-selected points along the conveyor path.

It is a main object of the invention to provide mechanism for automatically controlling the discharge of articles from a conveyor under the control of perforated statistical record cards which in addition to their conveyor controlling function are also used for production and/or wages control in that the cards are provided with conveyor control perforations and also with perforations which, when the cards are inserted into tabulating or other suitable forms of record card controlled statistical machines, permit the cards to be used for such purposes as wage or production computation.

In carrying this object into effect there is provided article conveying apparatus comprising a travelling conveyor, an article carrier detachably connectable to the conveyor for movement therewith and having an apertured platform by which a portion of a perforated statistical record card is locatable for sensing thereof, a carriage spring-urged to a datum position thereof and supported for movement from said position by engagement thereof by the article carrier, at least one sensing pin carried by the carriage for movement therewith and lengthwise movement relative thereto, actuating means operable during movement of the carriage by the article carrier to effect movement of the sensing pin towards the platform to effect sensing of a card portion located on the platform, an interposer disposable in the path of the article carrier to effect detachment of the carrier from the conveyor, and discharge mechanism operable under control of the sensing pin and cooperating with the interposer to effect operation thereof.

Figure 1:
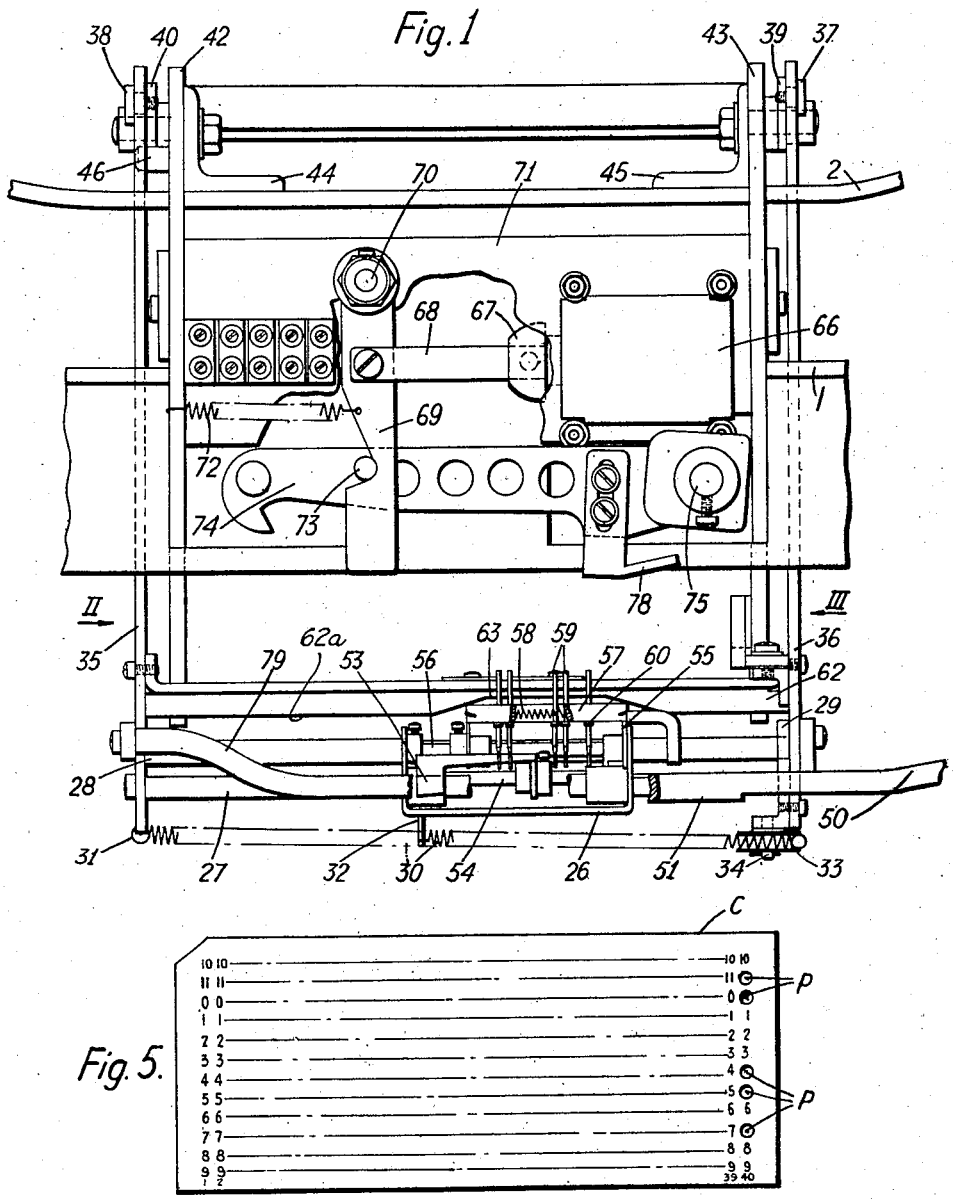
Figure 2:
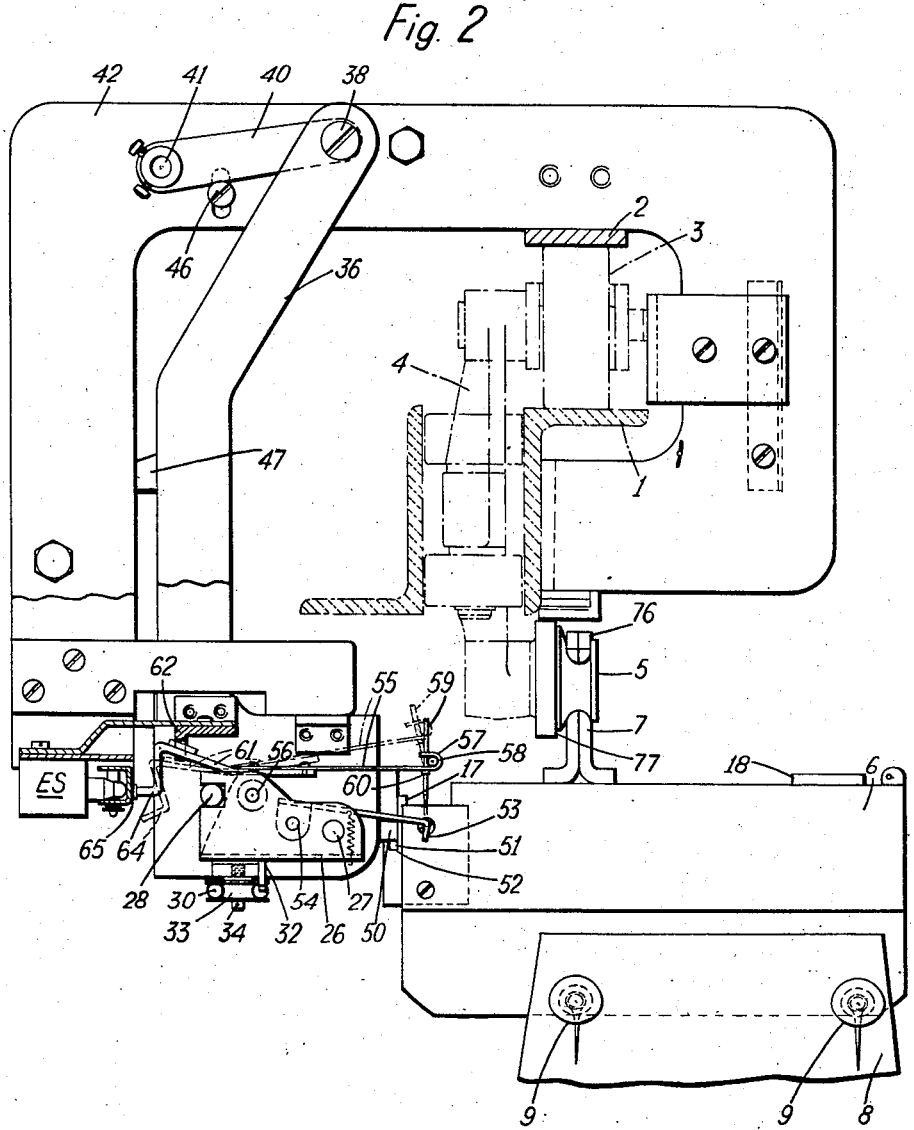
Figure 3:
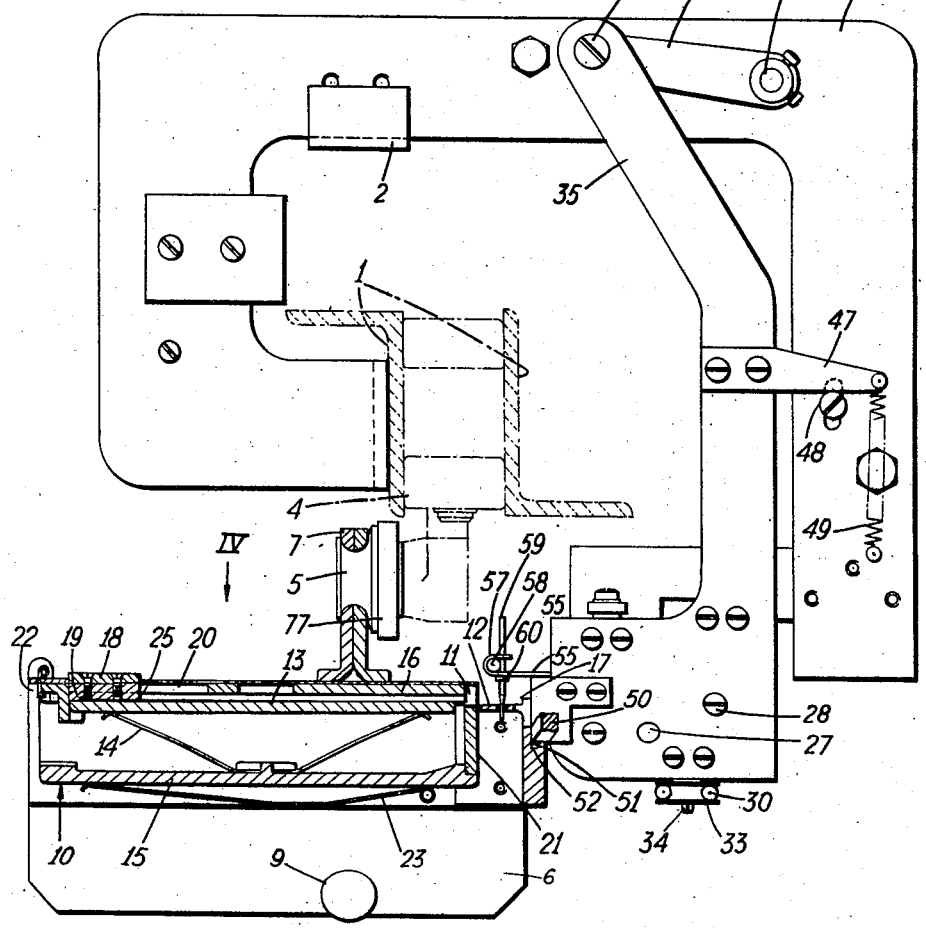
Figure 4:
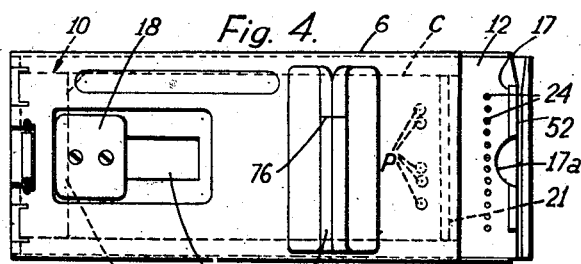
Figure 6:
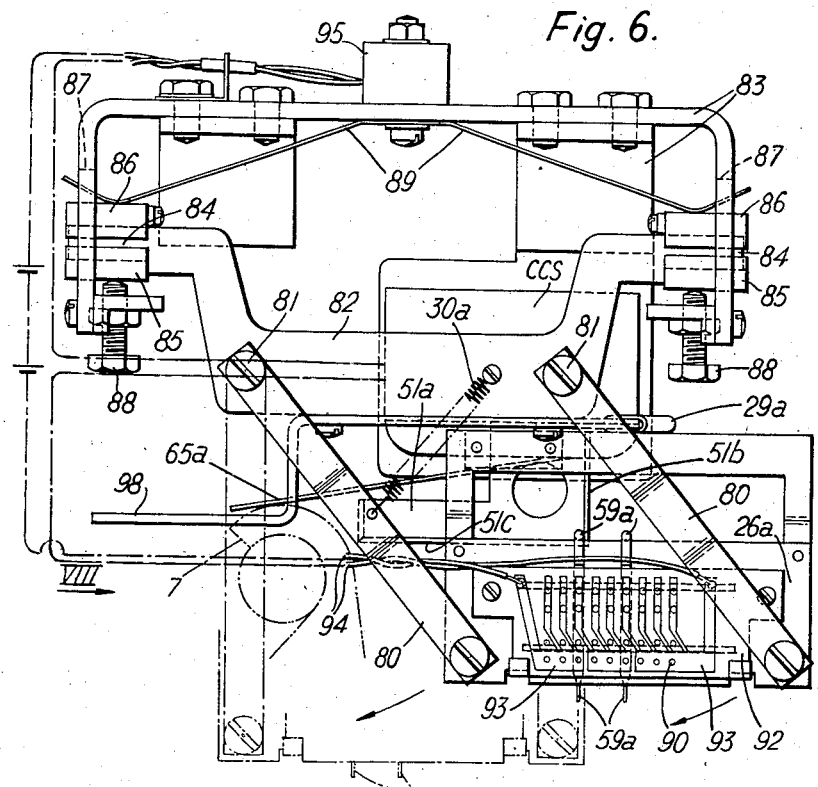
Figure 7:
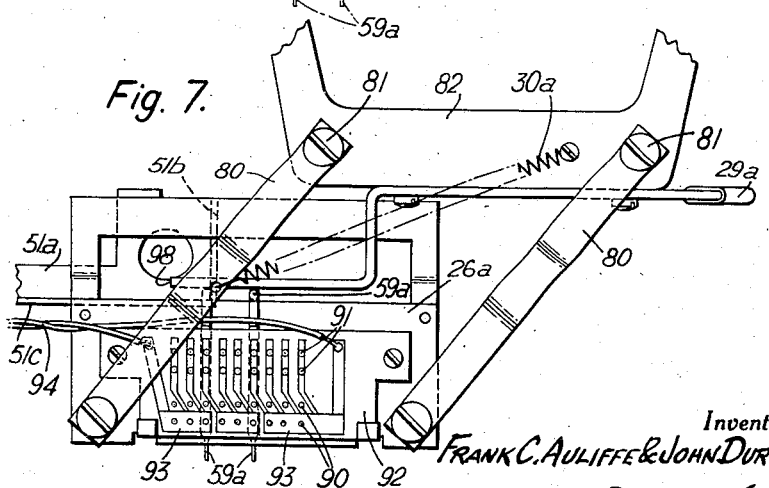

In order that the invention may be clearly understood, two embodiments thereof will now be described, by way of example, with reference to the accompanying diagrammatic drawings in which:

Fig. 1 is a side elevation, with parts broken away, of a sensing device and discharge mechanism constructed in accordance with the invention, the sensing device being illustrated in an intermediate position thereof, Fig. 2 is an end elevation, partly in section, looking in the direction of Arrow II, Fig. 1, Fig. 2A is a perspective view illustrating some of the parts shown in Figs. 1 and 2, Fig. 3 is an end elevation, partly in section, looking in the direction of Arrow III, Fig. 1, Fig. 4 is a top plan of an article carrier, looking in the direction of Arrow IV, Fig. 3, Fig. 5 illustrates a record card, Fig. 6 is a side elevation of an alternative mechanism according to the invention, Fig. 7 illustrates a part of the mechanism of Fig. 6 with some of the elements in different positions thereof, Fig. 8 is an end view looking in the direction of Arrow VIII, Fig. 6, Fig. 8A is a perspective view illustrating some of the parts shown in Figs. 6 and 8, and Fig. 9 illustrates a sensing pin as used in Figs. 6 to 8.

In the drawings like or similar parts are indicated by like reference numerals.

Referring to Figs. 1 to 5 of the drawings, the apparatus according to the invention is arranged for cooperation with a conveyor system by which work is conveyed around a factory and is automatically unloaded at pre-selected points along the conveyor path in order that operatives at such points may perform operations on the workpieces. The conveyor system may be of any suitable form and, as diagrammatically illustrated in the drawings, consists of trollies and linkage 4 guided during movement thereof by rails 1, Fig. 2. The trollies are provided with lugs 5 from which article carriers can be suspended and tipping of the trollies during movement of article carriers past a sensing position, as described below, is prevented by rollers 3, Fig. 2, and an upper rail 2.

In the embodiment of the invention being described, an article carrier comprises a housing 6, Figs. 2 and 3, having an attachment device, shown as a hook 7, for connection with a lug 5 on the conveyor. The articles to be conveyed are contained in a bag or skip 8, Fig. 2, which is secured to the housing 6 by studs 9, or any other suitable means.

Within the housing there is located a cassette which consists of a casing, indicated generally by the reference 10, Fig. 3, made for example of a transparent plastics material, the casing being provided with a delivery opening 11 at one end thereof for alignment with a platform 12 forming part of the housing 6. Within the casing 10 is located a card elevator 13, Fig. 3, on which cards C, of the kind shown in Fig. 5, are supported. A spring 14 is attached to the bottom 15 of the casing and urges the elevator 13 towards the top 16 of the casing so as to align a card C for movement through the delivery opening 11. Prior to the attachment of the article carrier to the conveyor the uppermost card in the cassette is moved endwise through the delivery opening 11 until the end portion of the card overlies the platform 12 and has its leading edge located against a stop 17 also formed on the housing 6. Movement of the card is effected by manipulation of a card picker 18 having a picker edge 19, the picker 18 being supported by the top of the casing to be slidable towards and away from the delivery opening 11. An opening 20 in the top of casing 6 permits manipulation of the picker 18.

The cassette is located within the housing 6 by the front end wall 21 being pressed into abutting relation with the edge of the platform 12 by a latch 22 acting on the rear end of the cassette. The cassette is supported against the top of the casing 6 by a spring 23.

Fig. 5 illustrates a statistical record card which may be of any suitable form and which, in the present instance, is assumed to be a 40-column card, that is a card which contains forty vertical columns in which data can be recorded by perforations or the like. Column No. 40 of the card is to be utilised solely for the purpose of destination determination and to this end column No. 40 is provided with a perforation pattern which, in Fig. 5, consists of perforations P formed in the card data-indicating positions 11, 0, 4, 5, and 7. The remaining thirty-nine columns of the card are employed, as is customary in the art, for the purpose of recording data relative to the work to be done during a particular operation thereon. Thus the card serves the dual purpose of controlling the destination of the work when carried by the conveyor, and its customary use in the factory accounting system where it can be employed by any of the usually used record card controlled statistical machines.

It will be understood that, in Fig. 3 the elevator 13 is illustrated in the last card supporting position thereof, but, at the start of an operation, there is inserted into the cassette a pile of cards, one card for each operation to be effected at a different station along the conveyor system. Before the article carrier is first attached to the conveyor system the uppermost card of the pile is fed by the picker 18 to the sensing position thereof at which the card column No. 40 overlies the platform 12 and the perforations P in column No. 40 are aligned, or substantially aligned with apertures 24, Fig. 4, one aperture 24 being provided for each of the twelve card data-indicating positions of column No. 40 of the record card. The purpose of the apertures 24 is to permit the passage of sensing pins through perforations P, as will be described below, and as is illustrated in Fig. 3.

When the article carrier is discharged from the conveyor, the operative at the point of discharge removes the uppermost card C from the card cassette by manipulation of picker 18. Initial movement of the picker, to the right as viewed in Figs. 3 and 4, causes the end 25 of the picker to move the uppermost card so as to cause the card to slide over the stop 17 thereby to permit the card to be easily gripped between a finger and thumb and removed from the cassette. Movement of the card over stop 17 is facilitated by the operative inserting a finger into a cut-out 17a, Fig. 4, and raising the edge of the card prior to manipulation of the picker. The movement of the picker 18 simultaneously causes feeding of the next card by the picker edge 19 into engagement with the stop 17 so conditioning the article carrier for replacement on the conveyor by the operative when the operative has performed his operation on the articles contained in the bag or skip 8. It will be understood that, if desired, the picker 18 may be arranged only to move a card into abutting relation with the stop 17, a previously sensed card being manually removed from sensing relation with the stop.

At each of the discharge stations along the conveyor system there is provided a card sensing device and discharge mechanism now to be described with reference to Figs. 1 to 3 of the drawings. The sensing device comprises a carriage 26, Figs. 1 and 2, which is supported by runners shown as rods 27, 28, the runners being supported by an articulated frame. The carriage is arranged to be slidable lengthwise of the runners to and from a datum position as defined by a resilient pad 29, Fig. 1. In Fig. 1 the carriage is shown as being in an intermediate position thereof but, except when it is engaged by the housing 6 of the article carrier, the carriage 26 is urged to the datum position by a spring 30 one end of which is anchored at 31 to the articulated frame while the other end is anchored to a pillar 32 extending downwards from the carriage 26. The spring 30 passes round a roller 33 freely rotatable on a pin 34 carried by the articulated frame.

The articulated frame comprises a pair of arms 35, 36 to the lower ends of which the runners 27, 28 are secured, the upper ends of the arms being pivoted at 37, 38 respectively to links 39, 40 pivoted on a spindle 41 rigidly mounted in frame plates 42, 43 secured to angle members 44, 45, Fig. 1, to which the rail 2 is also secured. The lever 40 normally abuts a fixed stop 46, Fig. 2. To the arm 35 is secured a balance lever 47 which is normally retained in abutting relation with a fixed balance stud 48, Fig. 3, by a balance spring 49. Also secured to the arms 35, 36 is a guide bar 50 provided with a tongue 51 for engagement in a groove 52 in the housing 6 of the article carrier thereby to locate the article carrier relative to the sensing device during sensing of a card. The arrangement of the frame is such that on engagement of the article carrier with the guide bar 50 the frame is moved upwards about the axis of the spindle 41, and the arms 35, 36 are moved clockwise, or counter-clockwise as necessary, about their pivots 37, 38 to ensure the proper location of the sensing device relative to the article carrier. The balance spring 49 biases the guide bar 50 to a predetermined initial position thereof such that the articulated frame on engagement of the article carrier with the guide bar 50 always permits slight movement of the carriage 26 upwards and away from the article carrier.

A transporter lever 53 is pivoted at 54, Fig. 2, to the carriage 26 and is engaged by the housing 6 of an article carrier, as illustrated in Fig. 2, so that the carriage is moved by the article carrier away from the datum position 29. A sensing lever 55, Figs. 2 and 2A, is pivoted at 56 to the carriage 26 and is so balanced about the pivot 56 as to tend gravitationally to move downwards, that is clockwise as viewed in Fig. 2. One end of the sensing lever 55 has a bent round portion 57 and within the portion 57 is located a spring 58, Fig. 2, which acts to retain sensing pins 59 in position relative to the sensing lever. In the embodiment of the invention herein described it is assumed that a pattern of five sensing pins is used and it will be understood that in order to ensure the proper operation of the apparatus there will be a predetermined pattern of five pins at each discharge station. It will also be understood that provided the pin pattern at all stations contains the same number of sensing pins the number of sensing pins per station may be other than five.

The sensing lever is provided with pairs of aligned apertures to receive the sensing pins and a pair of aligned apertures is provided for each of the twelve data-indicating positions of column No. 40 of a statistical record card. Each sensing pin is provided with a shoulder 60 for location against the under side of the sensing lever and the sensing pins 59 are inserted manually into the sensing lever according to a predetermined pattern indicative of the position of discharge at which the sensing device is located. As is illustrated in Fig. 1, the sensing pins 59 correspond to the card perforation pattern shown in column No. 40 of Fig. 5. The end portion 61, Figs. 2 and 2A, of the sensing lever is engaged with a fixed cam 62 secured to the arms 35, 36 and as the carriage 26 is moved from the datum position thereof, to the left as viewed in Fig. 1, the sensing lever portion 61 moves upwards from the chain line to the full line position thereof as shown in Fig. 2, into a dwell 63 formed in cam 62 so that the sensing pins 59 tend to move clockwise, that is downwards from the chain line position shown in Fig. 2, to effect sensing of the card portion located over the platform 12 on the article carrier. If the card perforation pattern should correspond with the sensing pin pattern, the pins will pass through the card, as illustrated in Figs. 2 and 3, and a tail 64 formed in continuation of the sensing lever portion 61 is moved to the position thereof shown in Figs. 2 and 2A, at which position it engages a switch-actuating member 65 which is thus caused to close an electro-magnet control switch ES of any suitable construction. The switch-actuating member 65 extends lengthwise of the path of the tail 64 beyond the left-hand end, as viewed in Fig. 1, of the dwell 63 and when the carriage 26 is passing the dwell 63, under control of an article carrier, and the sensing pin pattern differs from the perforation pattern of a card C located in the article carrier, so that the pins 59 do not pass through the card, the tail 64 is maintained in a position such that it passes beneath the member 65 and does not effect operation thereof to condition the discharge mechanism to cause release of the article carrier from the conveyor. On the return movement of the carriage 26, under the influence of spring 30, the end portion 61 of the sensing lever is again moved past the dwell 63 but at this time there is no article carrier located for sensing by the sensing pins 59 and the tail 64 must be prevented from actuating the member 65. During the first part of the return movement of the carriage 26 the tail 64 is maintained at a lower level than the bottom edge of the member 65 by cooperation with the straight under-face 62a of cam 62 and the length of member 65, considered lengthwise of the path of the carriage 26, is such that the tail 64 is moved beneath the member 65 before the lever portion 61 is aligned with the cam dwell 63. Thus as the lever portion 61 passes the dwell 63 on the return movement of the carriage 26 the tail 64 is engaged with the underside of the member 65 and does not therefore cause operation thereof to effect closing of switch ES.

Closing of the electro-magnet control switch ES causes an electro-magnet 66, Fig. 1, to be energised so moving, to the right as viewed in Fig. 1, the armature 67 to which is connected a latch link 68, Fig. 2, the latch link being also connected to a latch 69, pivoted at 70 to a frame member 71 secured between the frame plates 42, 43. The latch 69 is urged in a clockwise direction, as viewed in Fig. 1, by a spring 72 and co-operates with a pin 73 extending laterally from an interposer, shown as a hook 74, pivoted at 75 to a bracket secured to the frame plate 43. Energisation of the electro-magnet 66 causes the latch 69 to be moved, counter-clockwise as viewed in Fig. 1, so that the interposer 74 moves by gravity about its pivot 75 and is interposed into the path of the upper portion 76, Fig. 2, of the hook 7 so that, due to the continued movement of the conveyor, the interposer 74, by co-operation with the hook portion 76, causes the article carrier to be disengaged from the conveyor lug 5. Prior to the disengagement of the article carrier from the conveyor the sensing pins 59 are moved by cam 62 out of sensing relation with the record card and platform 12.

The interposer 74 is restored to the inactive position thereof, as illustrated in Fig. 1, by the approach of the next succeeding conveyor lug 5 to which is fitted an abutment in the from of a washer 77, Fig. 2. The abutment 77 engages with a restoring cam 78, Fig. 1, carried by the interposer 74 and effects lifting of the interposer to effect latching thereof by the latch 69, it being understood that at this time the electro-magnet 66 is de-energised so that the latch 69 is under control of spring 72.

In the event that when the sensing device reaches the position thereof illustrated in Fig. 1, the sensing pin pattern does not correspond with the perforation pattern of the card presented for sensing thereby, the sensing pins, as described above, will not pass through the card and, accordingly, the electro-magnet control switch ES will not be operated to condition the interposer to effect disengagement of the article carrier from the conveyor. Accordingly, the article carrier will continue to move the carriage 26 away from the datum position 29 thereof until the transporter lever 53, which overlies the guide bar 50, is engaged with an up-turned portion 79, Fig. 1, of the guide bar 50, the portion 79 acting as a cam which disengages the transporter lever 53 from the article carrier so that, while the movement of the article carrier is continued by the conveyor, the sensing device is restored to the datum position 29 thereof by spring 30.

It will be understood that the discharge mechanism may be different from that described above, for example instead of the sensing lever tail 64 effecting operation of a switch to condition the electro-magnet, conditioning of the latch interposer may be effected by a Bowden wire operation of which is effected by the sensing lever tail 64.

Referring to Figs. 6 to 9, the sensing device comprises a carriage 26a which is supported by parallel links 80 which are pivoted at 81 to an articulated frame. The carriage is movable to and from the datum position thereof as defined by a resilient pad 29a, Fig. 6, and in Fig. 7 is shown in the position thereof at which it is most remote from the datum position. The carriage is urged to the datum position by a spring 30a.

The articulated frame comprises a bar 82 and a bracket 83 by which the sensing device is attached to the rail 1. The bar 82 is provided with co-axial trunnions 84 the axis of which extends lengthwise of the path of the article carrier 6. A split bearing is provided for each trunnion 84 and consists of two independent bearing elements 85, 86 each slidable lengthwise of slots 87 formed in the bracket 83. The position of bar 82 can be adjusted vertically in relation to the path of the carriers 6 by adjusting screws 88. A spring 89 co-operates with the bearings to urge the trunnions 84 towards the path of carriers 6.

The carriage 26a has fitted thereto an electromagnet control switch, of which sensing pins 59a form part, to control operation of the electro-magnet 66, Figs. 1 and 8A, and the electro-magnet control switch comprises fixed electric contacts 90, 91, Fig. 7, provided on an electrically insulating plate 92 fixed to a second insulating plate 92a, Fig. 8, which is secured to the carriage and is slotted to permit moving contacts 59b, Fig. 9, carried by the sensing pins 59a to be movable lengthwise between the insulating plates to open or close the switch. Predetermined ones of the lowermost contacts 90 are connected in common by printed connections 93 and the contacts 91 are connected, as shown in the drawings, by printed connections with the common connections 93. The common connections 93 are connected by wires 94 through a normally open circuit-control switch CCS with a socket 95, Figs. 6 and 8A, adapted to receive a plug, not shown, by which connection is effected with the electro-magnet 66 thus permitting the electro-magnet 66 and interposer 74 to be located at a position remote from the sensing position. The sensing pins 59a are guided for independent lengthwise movement by guides 96, 97, Fig. 8, extending from the rear of the carriage 26a, and in the initial positions thereof, as illustrated in the drawings, the hooks at the tops of the pins engage the top edge of the carriage so that the portions 59c, 59d, Fig. 9, engage the fixed contacts 90, 91 appropriate thereto and so effect electrical connection between the connections 93. During lengthwise movement of pins 59a the circuit control switch CCS is open so that the printed connections are not "live" during movement of the pins. The circuit between the electro-magnet 66 and the electro-magnet control switch ES is rendered "live" for a short interval between the sensing of a card and the restoring of the pins due to operation of the actuating member 65a for switch CCS by the hook 7 of housing 6, as indicated in Fig. 6. Thus if no pin 59a encounters an imperforate card portion the electro-magnet 66 is energised and delatches the interposer 74 for location thereof in the path of hook 7. If, however, on sensing a card one or both of the pins 59a encounters an imperforate card portion the pin, or both pins, will be moved lengthwise in an upward direction and will open the electro-magnet control switch ES so that, on closing of the circuit control switch CCS, the electro-magnet is not energised, the interposer 74 is not delatched, and the carrier is not discharged from the conveyor. As the carriage approaches the position thereof illustrated in Fig. 7 any pin 59a which has been raised from the initial position thereof is engaged by a restoring plate 98 and is returned thereby to its initial position in preparation for the next sensing operation.

Actuation of the carriage to effect a sensing operation is effected by guide means carried by the carrier 6, the guide means in this embodiment of the invention consisting of a V-wheel 52a freely rotatable on the hook 7 for the carrier 6. The wheel 52a co-operates with a tongue 51a and first engages the rear edge 51b thereof to swing the carriage 26a clockwise, as viewed in Fig. 6, about pivots 81. The sensing pins are thus caused to move with the carrier and downwards, to the position indicated in chain lines in Fig. 6, relative thereto to effect sensing of the card and as the carriage commences to rise towards the restoring element 98 the underneath edge 51c of the tongue rides on the wheel, the bar 82 being lifted against the action of spring 89. Should the wheel be not quite aligned with the tongue when first engaged therewith the tongue will be engaged by a V-side of the wheel so that the carriage will be rocked, as appropriate, about the axis of trunnions 84 to align the tongue with the wheel and so ensure that the sensing pins are properly positioned relative to the card to effect sensing thereof.

In the preceding description, operation of the discharge mechanism has been described, as being effected by the sensing of destination perforations provided in a single card column No. 40, but it will be understood that, if desired, two or more card columns may be employed for the provision of destination perforations, the card columns being adjoining columns, and that, in such instances, the sensing lever 55, or the carriage 26a, will be constructed to support two or more rows of sensing pins 59.

We claim:

1. Article conveying apparatus comprising a travelling conveyor, an article carrier detachably connectable to the conveyor for movement therewith and having an apertured platform by which a portion of a perforated statistical record card is locatable for sensing thereof, a carriage spring-urged to a datum position thereof and supported for movement from said position by engagement thereof by the article carrier, at least one sensing pin carried by the carriage for movement therewith and lengthwise movement relative thereto, actuating means operable during movement of the carriage by the article carrier to effect movement of the sensing pin towards the platform to effect sensing of a card portion located on the platform, an interposer disposable in the path of the article carrier to effect detachment of the carrier from the conveyor, and discharge mechanism operable under control of the sensing pin and co-operating with the interposer to effect operation thereof.

2. Apparatus according to claim 1, wherein the interposer is supported for pivotal movement into and out of the path of the article carrier and the discharge mechanism includes a pivoted latch spring-urged into latching relation with the interposer to retain the interposer in the position thereof in which it is out of the path of the article carrier, and delatching means operable under control of the sensing pin to release the latch from the interposer and permit movement of the interposer into the path of the article carrier.

3. Apparatus according to claim 2, wherein the delatching means comprises a latch link connecting the latch to an electro-magnet operation of which is controlled by an electro-magnet control switch operable as the result of the sensing by the pins of said predetermined perforation pattern.

4. Apparatus according to claim 3, including a restoring cam carried by the interposer for co-operation when in the active position with an abutment carried by a conveyor part from which an article carrier is suspended thereby to restore the interposer to the inactive latched condition thereof.

5. Apparatus according to claim 4, including a normally open circuit-control switch interposed between the electro-magnet and said electro-magnet control switch for operation by an article carrier between a sensing operation of the sensing pins and restoring thereof thereby temporarily to close the circuit between the electromagnet and the electro-magnet control switch.

6. Apparatus according to claim 5, wherein the electro-magnet control switch comprises fixed electric contacts mounted on said carriage and electrically connected with the electro-magnet, and a movable contact carried by each sensing pin and operable on closing of the circuit control switch to close the electric circuit to the electromagnet, said movable contacts being movable with the sensing pins to open the circuit on axial movement of the sensing pins as the result of the engagement thereof with imperforate record card portions and restored to the circuit closing positions thereof by a restoring element co-operable with the sensing pins on movement thereof out of sensing relation with a card.

7. Apparatus according to claim 1, including a bar from which the carriage is suspended by parallel links each pivotally connected at one end to the bar, co-axial trunnions the axis of which extends lengthwise of the path of the article carrier, a split bearing for each trunnion permitting pivotal movement of the trunnions about their axis and movement thereof towards and away from the path of the carrier in a plane at right-angles thereto, and resilient means co-operating with the bearings to urge the trunnions towards said path.

8. Apparatus according to claim 7, wherein the actuating means comprises a tongue secured to the carriage for movement therewith and engageable by a freely rotatable V-wheel carried by the article carrier, said tongue and wheel acting also to effect location of the carriage relative to the carrier.

9. Apparatus according to claim 1, including runners supporting the carriage for movement lengthwise thereof by the article carrier, a frame carrying said runners and permitting movement of the carriage towards and away from the path of the article carrier on engagement of the carrier with the carriage, and a sensing lever carrying said sensing pin and supported by the carriage for movement therewith and for movement relative thereto under control of said actuating means.

10. Apparatus according to claim 9, wherein the frame comprises a pair of arms the lower ends of which support said runners, links pivoted one to the upper end of each said arm and supported for rocking movement about a fixed axis, a balance lever secured to one of the said arms and engaging a fixed balance stud, and a spring urging the balance lever against the balance stud and tending to maintain the carriage in position for initial co-operation with the article carrier.

11. Apparatus according to claim 10, wherein the sensing lever is pivoted on the carriage and includes a plurality of pairs of aligned apertures to receive sensing pins, and resilient means to retain sensing pins in position relative to the sensing lever.

12. Apparatus according to claim 11, wherein the actuating means comprises a cam carried by said frame to co-operate with the sensing lever and control movement of the sensing pins into and out of sensing relation with said platform.

13. Apparatus according to claim 12, including a guide bar carried by said arms, and a tongue formed on said guide bar for co-operation with a groove formed in an article carrier thereby to align the carriage relative to the article carrier for sensing of a card carried by the carrier.

14. Apparatus according to claim 13, wherein the guide bar is shaped to effect release of the carriage from an article carrier as the carriage approaches the end of its movement away from the datum position thereof.

15. Apparatus according to claim 13, wherein engagement between the carriage and an article carrier is effected by a carriage transporter lever pivoted on the carriage to extend into the path of the article carrier for engagement thereby, said carriage transporter lever being arranged to overlie said guide bar to cooperate therewith to effect said release of the carriage from the article carrier.

16. Article conveying apparatus comprising a travelling conveyor, a housing having an attachment device for connection with the conveyor for movement therewith, means to permit attachment of an article holder to the housing, a sensing platform movable with the housing to support a statistical record card portion for sensing thereof, said platform being apertured to permit the passage therethrough of sensing pins, a card cassette supported within the housing, card locating means co-operating with the cassette and operable to locate a card portion relative to said platform for sensing, a carriage movable by the article carrier and supporting at least one sensing pin for movement with and relative to said platform to permit sensing of a record card, and discharge mechanism including an interposer disposable in the path of said attachment device to effect disengagement of the housing from the conveyor under control of said sensing pin.

17. Apparatus according to claim 16, wherein the card cassette comprises a casing having a delivery opening at one end for alignment with said platform, a card elevator on which cards are supported within the casing, a spring to urge the elevator towards the top of the casing to align a card for movement through the delivery opening, and a manually operable card picker supported by the top of the casing to be slidable towards and away from the delivery opening for the purpose of positioning a card relative to said platform for sensing.

References Cited in the file of this patent

UNITED STATES PATENTS

| | | |
|---|---|---|
| 2,539,013 | Forse | Jan. 23, 1951 |
| 2,755,908 | Freeman | July 24, 1956 |
| 2,757,781 | Freeman | Aug. 7, 1956 |
| 2,794,535 | Hauschild | June 4, 1957 |
| 2,803,333 | Freeman | Aug. 20, 1957 |